Oct. 16, 1962
M. H. GOODNER
3,058,460
METHOD AND APPARATUS FOR SUPPLYING AND
EXHAUSTING OR EXCHANGING A
CONTROLLED VOLUME OF GAS
Filed Jan. 8, 1957
8 Sheets-Sheet 1
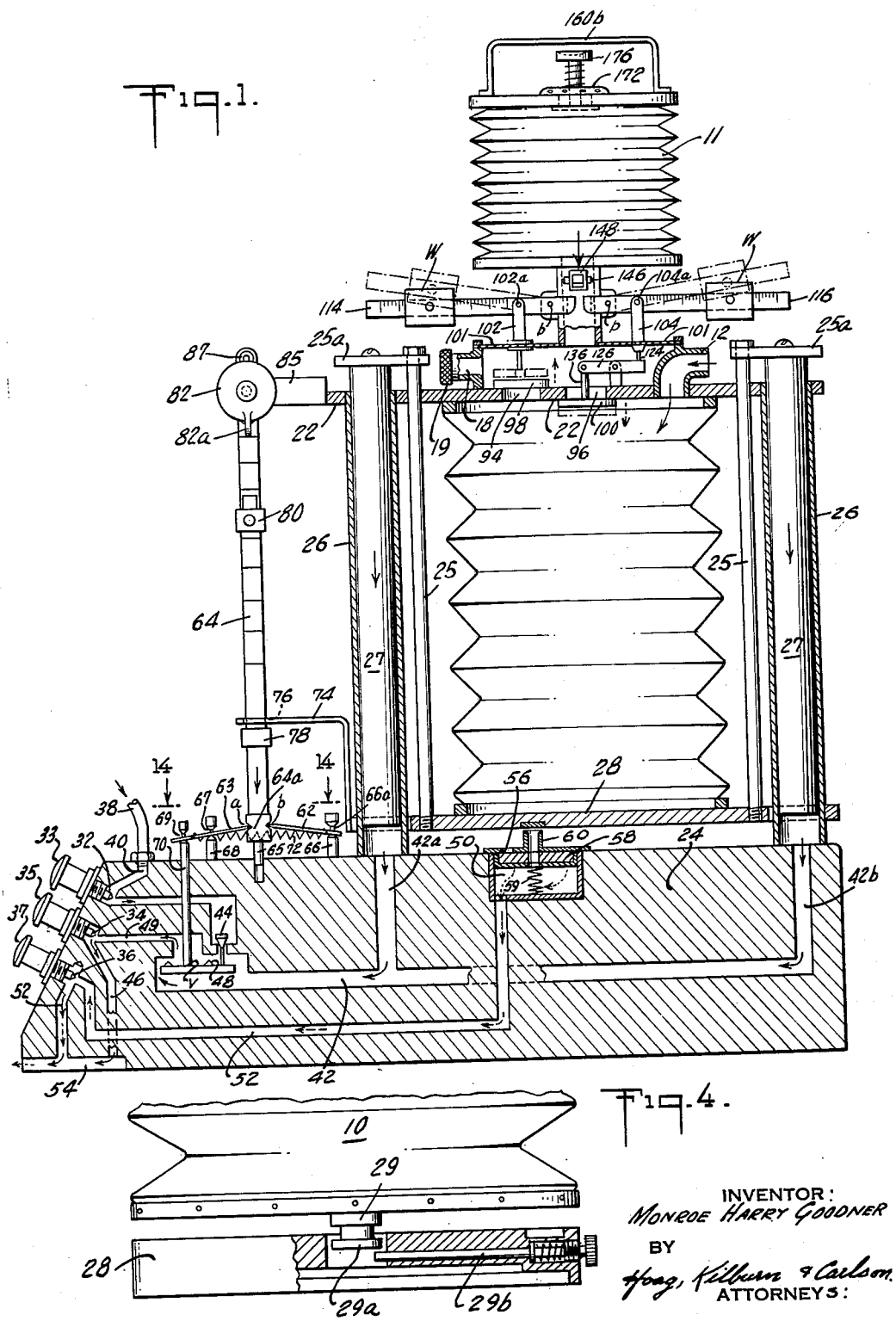
INVENTOR:
MONROE HARRY GOODNER
BY
Hoag, Kilburn & Carlson
ATTORNEYS

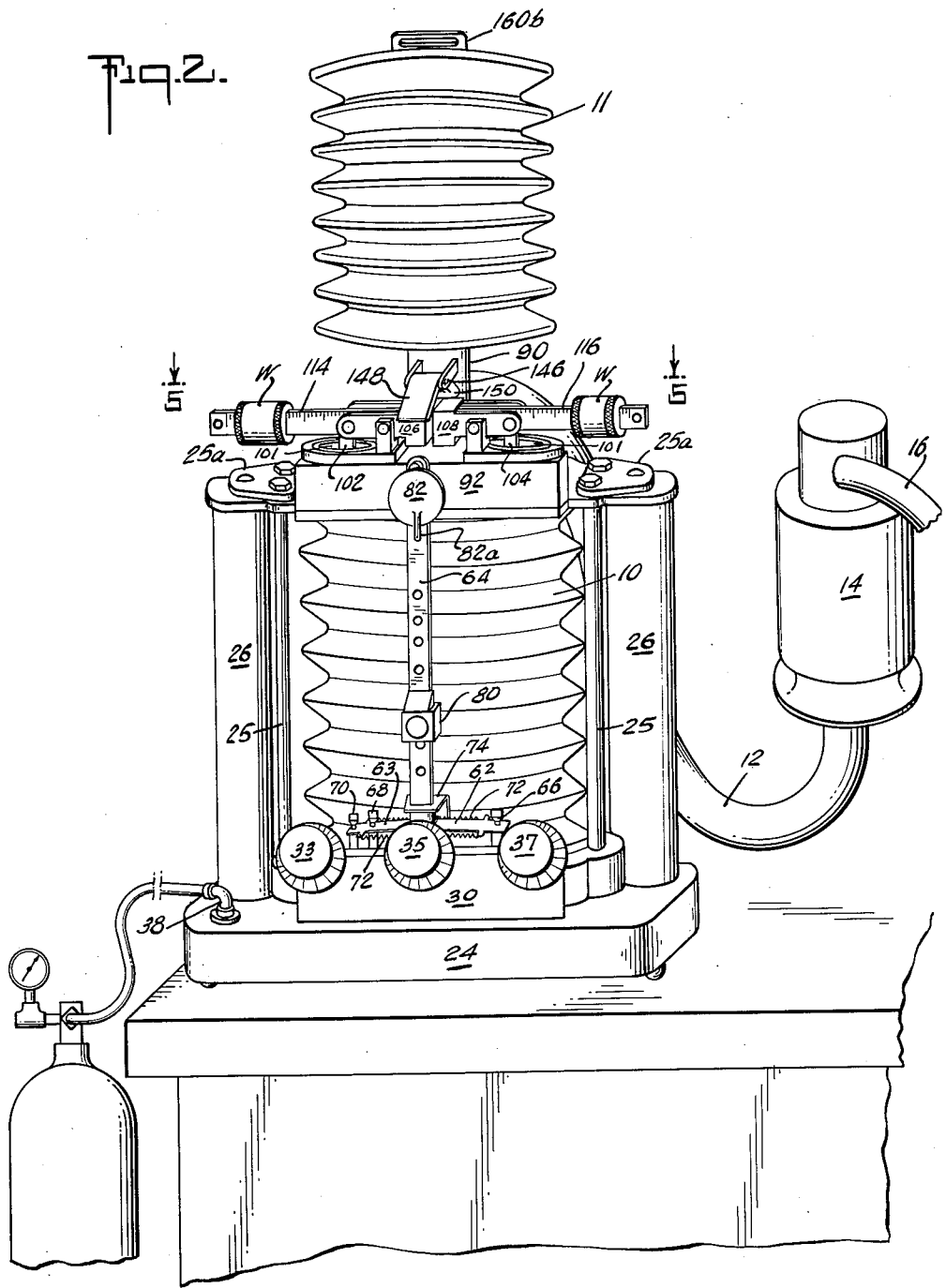

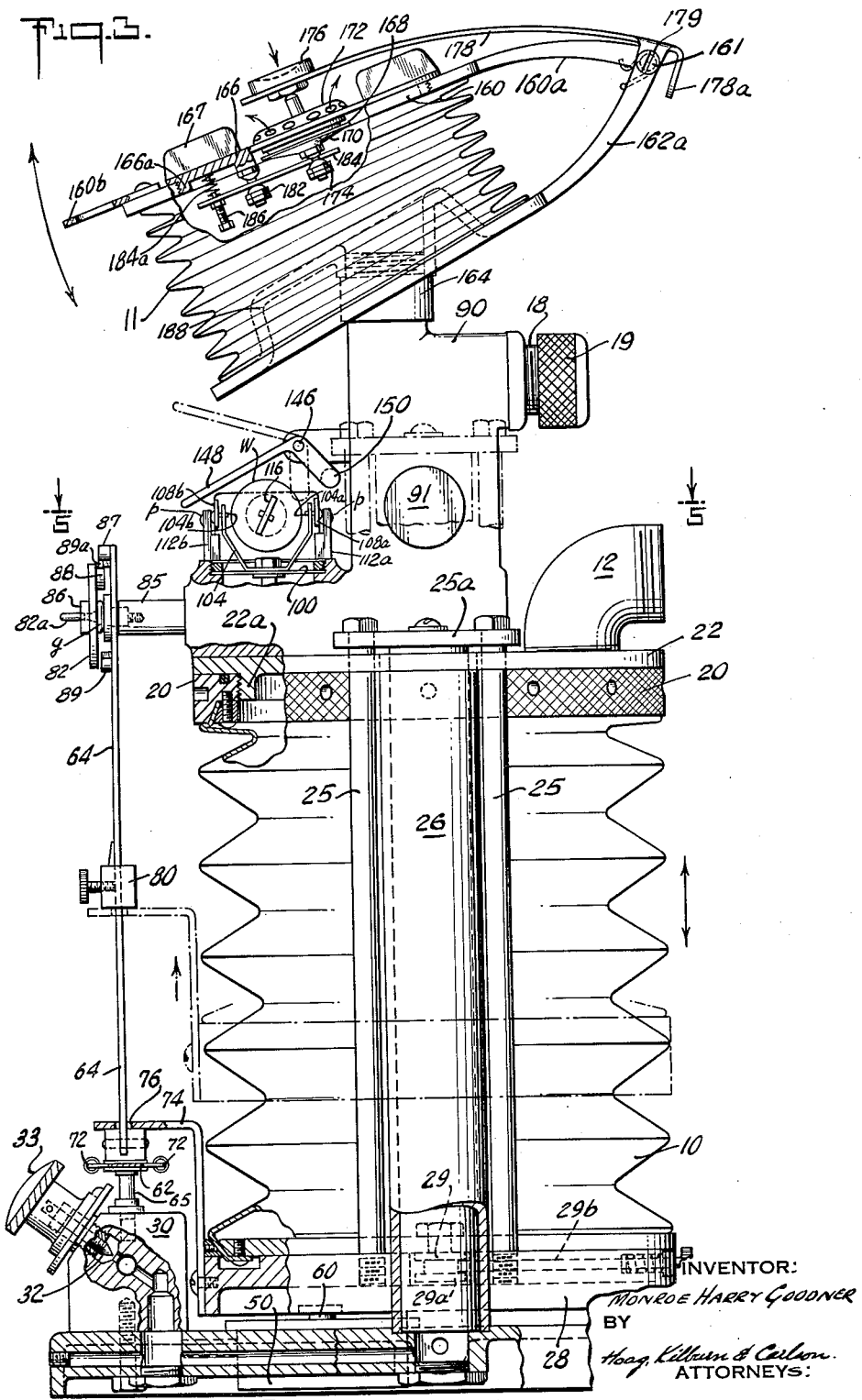

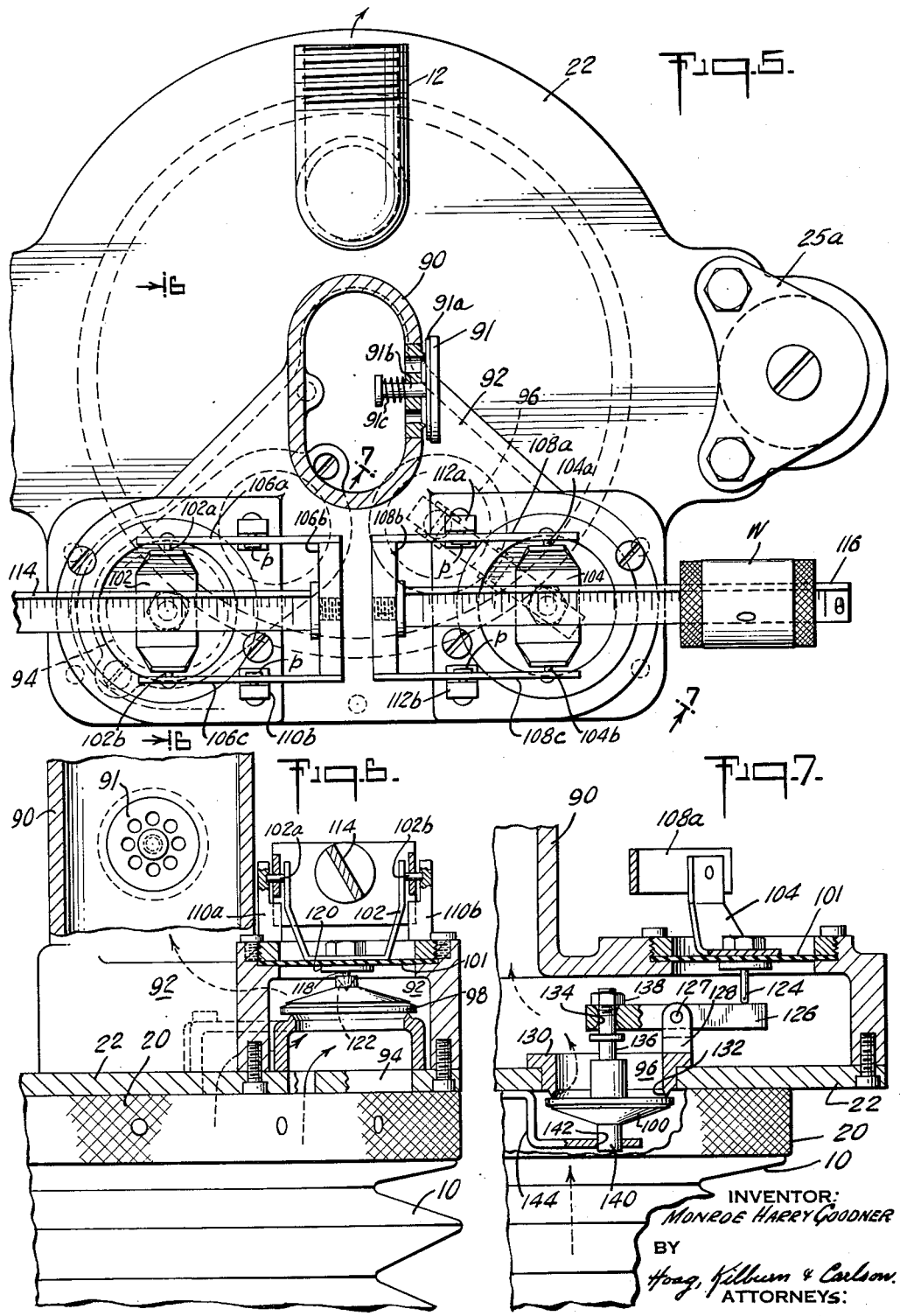

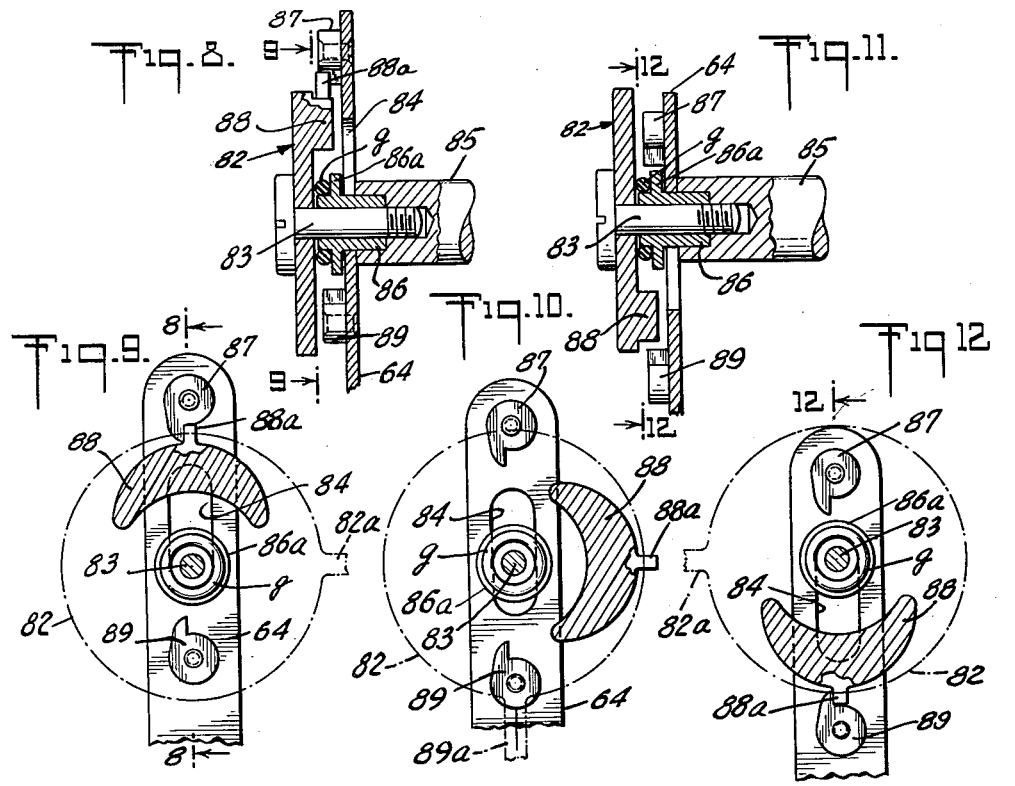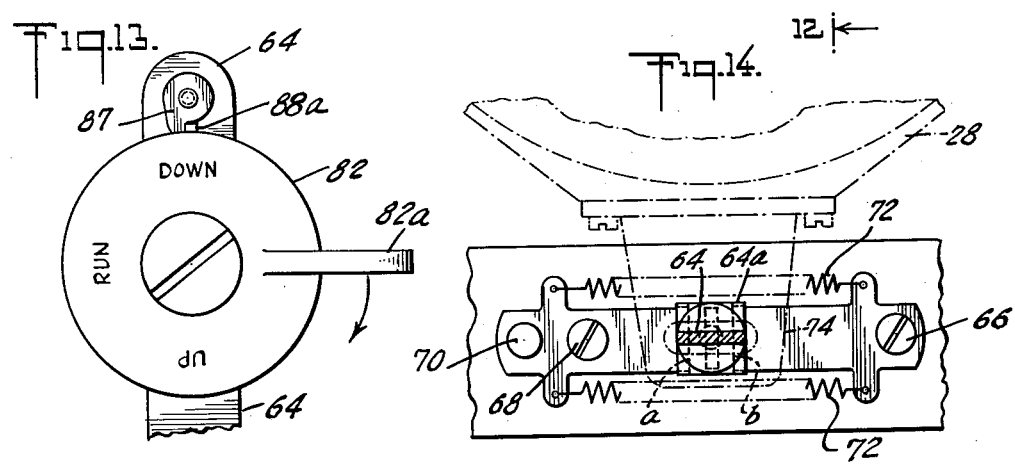

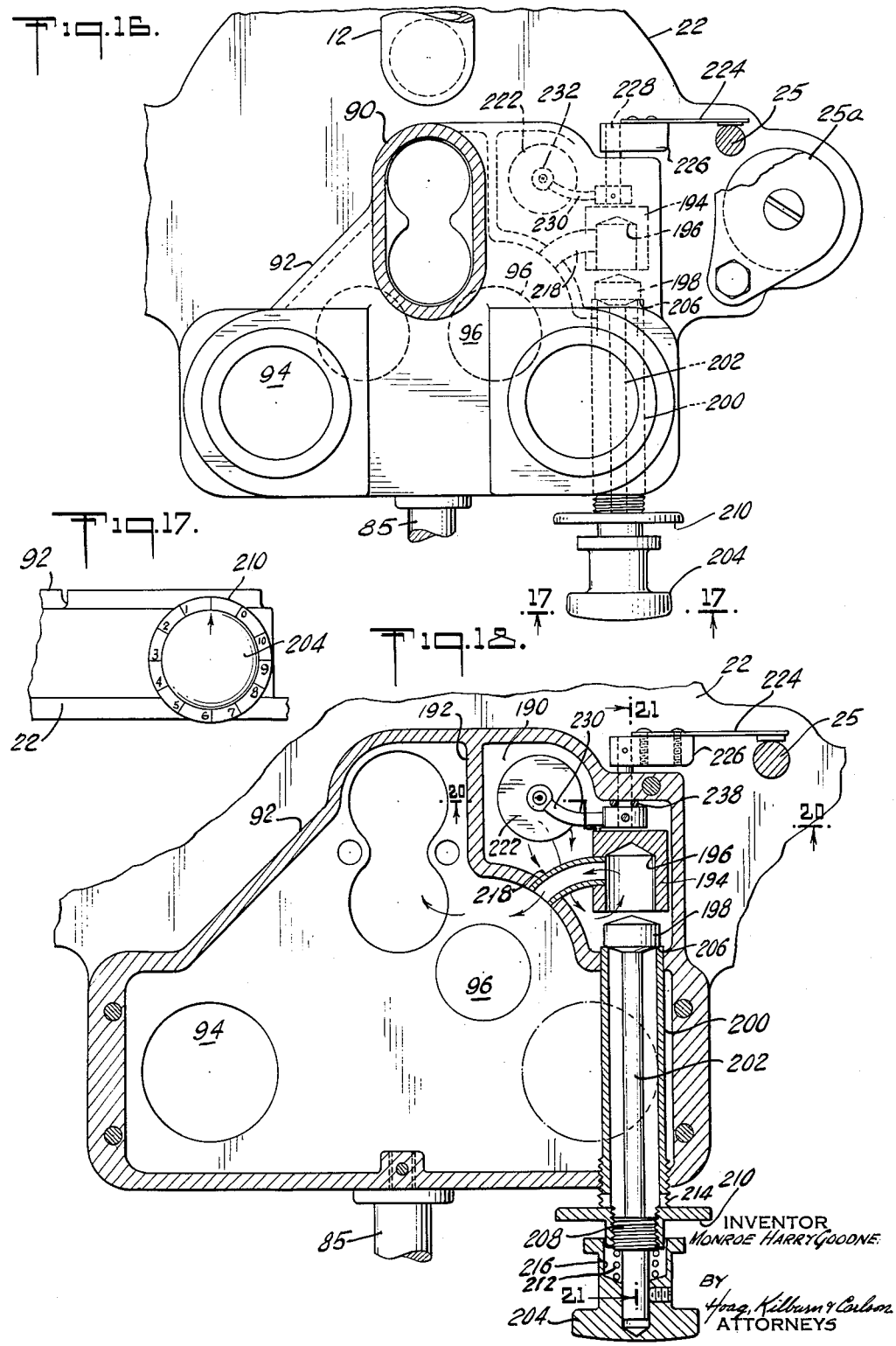

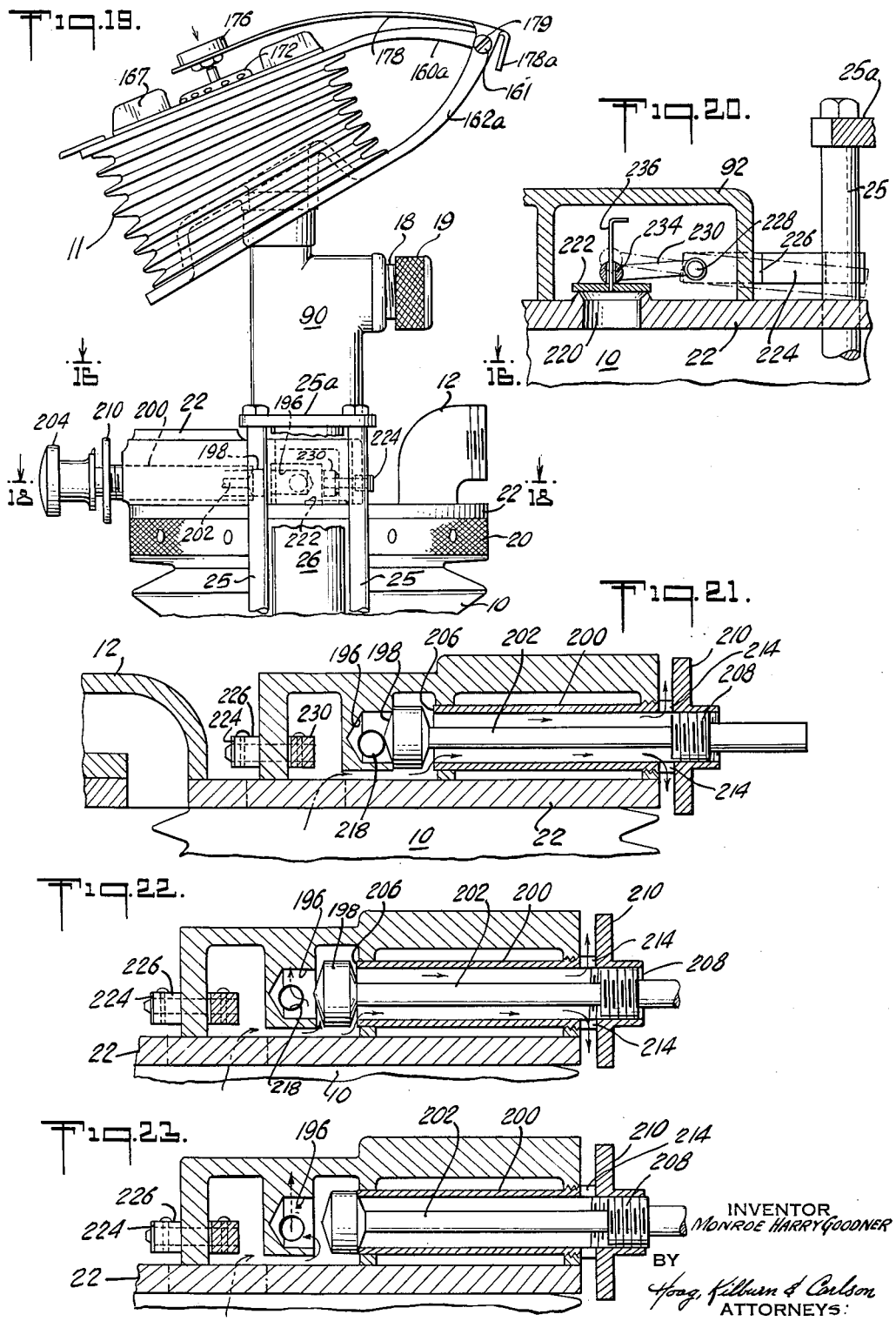

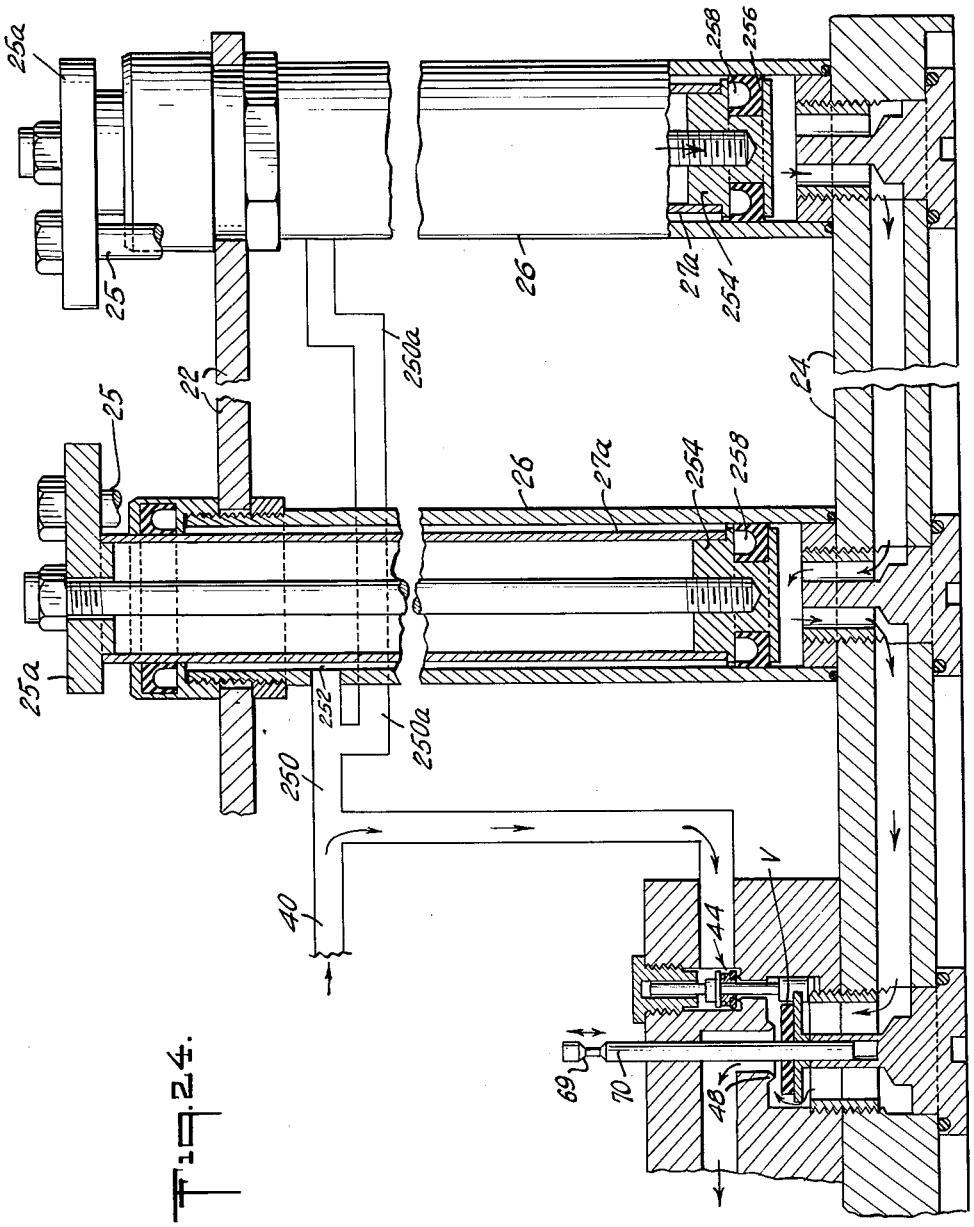

3,058,460
METHOD AND APPARATUS FOR SUPPLYING AND EXHAUSTING OR EXCHANGING A CONTROLLED VOLUME OF GAS
Monroe Harry Goodner, Red Bank, N.J., assignor to Stephenson Corporation, Red Bank, N.J., a corporation of New Jersey
Filed Jan. 8, 1957, Ser. No. 633,163
21 Claims. (Cl. 128—29)

This invention relates to method and apparatus for alternately supplying and exhausting a predetermined volume of gas or mixture of gases in successive cycles each phase of which is of controlled duration and may be varied. The duration of each cycle may be controlled as well as the duration of each phase of the cycle, including the duration of an interval or a pause between successive phases of a cycle. In the operation of this method and apparatus the pressure in the system is variable as may be required, within established limits, to accomplish the supply and withdrawal of a predetermined and easily adjustable volume of gas. This application is a continuation-in-part of my copending application Serial No. 559,889, filed January 18, 1956, now abandoned.

The term gas is used herein to include air or other gas and mixtures of gases.

The term tidal volume is used herein to mean the volume of gas supplied to or withdrawn from a patient's lungs during a single phase of a breathing cycle, and to distinguish from other volume control which is not for each phase of a breathing cycle but is only for the total volume supplied over a unit of time, such for example as a minute. Ability to give tidal control distinguishes the device disclosed herein from resuscitators which supply and withdraw the predetermined volume of gas per minute by varying the rate of breathing to compensate for variations in the depth of breathing.

The method and apparatus have a number of applications. They are described herein in connection with the control of breathing and specifically as an adjunct to known equipment for mixing gases and supplying them to a face mask to be placed over the mouth and nose of a patient for anesthetizing a patient, as for example during an operation and especially during chest surgery.

An object of the invention is to provide means of the above mentioned kind for ventilating a lung adequately by positive pressure only, negative pressure only, or by positive and negative pressure by a manual method.

Another object of the invention is to supply a breathing control device whereby a patient may breath normally a supply of anesthetic or therapeutic gas.

Another object of the invention is to provide a device of the above mentioned kind with means to jet in air to be adminstered alone or in conjunction with anesthetic or therapeutic gases by the controlled, assisted or manual method.

Another object of the invention is to provide a device in which the possibility of not having an adequate supply of gas to deliver into the inhalation circuit is avoided and safety valve means is provided to jet in air to meet the desired tidal volume.

Another object of the invention is to provide a device of the above mentioned kind having a safety release against building up of gases in the patient-machine circuit.

Another object of the invention is to provide means in the subject device to indicate by visual methods the same signs of anesthesia which are felt by the anesthesiologist's hand when doing manually controlled breathing.

Another object of the invention is to provide means for indicating at all times the amount of gas volume delivered into the patient's circuit and the pressure (amount of positive, negative, or positive and negative) required to deliver that amount of gas going into the patient's circuit.

An object of the invention is to provide improved method and means for alternately supplying and exhausting a controlled volume of gas in a closed, open or semi-open system.

Another object of the invention is to deliver the desired volume of gas during each phase while controlling separately the duration of each phase and the duration of each cycle, including an interval between phases, if desired.

Another object of the invention is to provide means for quickly exhausting gas from a patient's lungs at the start of the exhalation phase of each breathing cycle.

Another object of the invention is to provide means for controlling the volume of gas in the apparatus and to prevent the level of "dead" or unchanged gas in the lungs from building up.

Another object of the invention is to provide a device of the above described kind which is fully automatic but may be operated manually.

Another object of the invention is to provide improved control means for apparatus of the above described kind.

Another object of the invention is to provide improved method and means for assisting or controlling breathing.

Another object of the invention is to obtain deeper ventilation of the lungs than is normal for a patient at the time.

Another object of the invention is to provide method and means by which a greater negative pressure may be obtained during exhalation than the positive pressure applied during the preceding inhalation phase.

Another object is to provide method and apparatus which may be used in conjunction with anesthesia equipment in a closed, open, or semi-open system.

Other objects of the invention will appear from reading the following description and the appended claims.

The invention will best be understood if the description is read in connection with the drawings in which, FIGURE 1 is a schematic view partly in cross section of the device shown in FIGURE 2.

FIGURE 2 is a front elevational view of a device embodying the invention.

FIGURE 3 is a side elevational view of the embodiment of the invention shown in FIGURE 2, partly cut away to show interior portions of the device and partly in cross section.

FIGURE 4 is a detail view of means for locking the bottom of bellows 10 to removable platform 28a for readily mounting or removing the bellows 10 from the assembly.

FIGURE 5 is a top plan view partly in cross section taken on the line 5—5 of FIGURE 2.

FIGURE 6 is a side elevational view partly in cross section taken on the line 6—6 of FIGURE 5.

FIGURE 7 is a vertical section view taken on the line 7—7 of FIGURE 5.

FIGURE 8 is a side view partly in cross section taken on the line 8—8 of FIGURE 9.

FIGURE 9 is a detail view of the control dial at the top of the control rod showing the dial positioned for locking bellows 10 in its fully collapsed position.

FIGURE 10 is a view similar to FIGURE 9 showing the dial set for running position.

FIGURE 11 is a side elevation partly in cross section of the dial taken on the line 12—12 of FIGURE 12.

FIGURE 12 is a view similar to FIGURES 9 and 10 but showing the dial positioned for locking the bellows in its fully expanded position.

FIGURE 13 is a view similar to FIGURE 12 but showing the dial face.

FIGURE 14 is a detailed plan view of the toggle mechanism taken on the line 14—14 of FIGURE 1.

FIGURE 15 is a detail view in perspective showing the lower end of the control rod 64 and the V-shaped grooves in the portion 64a of the control rod for engaging the knife edge inner ends of the toggle arms.

FIGURE 16 is a plan view partly in cross section taken on the line 16—16 of FIGURE 19.

FIGURE 17 is a front elevational view taken on the line 17—17 of FIGURE 16 showing in detail a calibrated disk for use in adjusting the bleeder valve member 198 between the port leading to the storage chamber and the exhaust port leading to atmosphere.

FIGURE 18 is a plan view partly in cross section taken on the line 18—18 of FIGURE 19.

FIGURE 19 is a view similar to the upper portion of FIGURE 3 but with the structure modified by the inclusion of the relief valve 222, the bleeder valve 198 and the control handle for the bleeder valve.

FIGURE 20 is a vertical detail view partly in cross section taken on the line 20—20 of FIGURE 18.

FIGURE 21 is a side elevational view partly in cross section taken approximately on line 21—21 of FIGURE 18 and showing the assembly of the relief and bleed valves (3rd and 4th valves) in position to cut off all flow of gas through the relief valve to the storage chamber and to direct the entire flow of gas to atmosphere.

FIGURE 22 is a view similar to FIGURE 21 showing the bleed valve unseated and permitting flow of gas through the relief valve to the storage chamber and also to atmosphere.

FIGURE 23 is a view similar to FIGURES 21 and 22 but showing the bleed valve in position to cut off all flow of gas to atmosphere so that all gas passing through the relief valve flows through the passage leading to the conduit which leads to the storage chamber, and FIGURE 24 is a diagrammatical cross section showing a modification of the cylinder structure for collapsing and expanding the container and the compressed air channels employed for collapsing and expanding container 10.

In the embodiment of the invention disclosed herein a pair of expansible and collapsible gas containers 10 and 11 are employed, 11 acting as an overflow and storage chamber for 10 for automatic operation but adapted to be employed alone for manual operation. Both 10 and 11 are exemplified herein as bellows and the coaction between them is described below. Conduit means 12 leads from container 10 to anesthesia administrating apparatus of any known kind, indicated generally by the numeral 14, which is connected by conduit 16 (FIG. 2) to a face mask, endotracheal tube, tracheotomy tube or the like (not shown). The gas may be initially supplied to the anesthesia apparatus for one or more tanks or cylinders of gas, which may be of various kinds mixed together in various amounts within the anesthesia equipment, and supplemented from time to time from said source or sources as may be required. For the "open and semi-open methods" the gas or gases may be supplied continuously to container 10 through conduit means 18 from the outer end of which cap 19 is removed for this method and discharged to atmosphere without recycling after being delivered through the anesthesia equipment to the patient's lungs and withdrawn therefrom.

It will be understood that the device may also be used as an automatically operated or a manually operated respirator by simply connecting conduit 12 directly to the patient and introducing compressed air or oxygen or other gas into inlet conduit 18, in which case the gas may be discharged at the face mask. For use as a respirator with pressure high enough to open valve 176 the upper gas container 11 may be removed and the upper end of conduit 90 closed in any suitable way.

Container 10 is shown herein fixed at the top by means 20 to the cross member 22 of support means comprising the base 24 from which rise the hollow columns 26 on which cross member 22 is mounted. Member 20 is preferably made so that it can be screwed on to a flange 22a. Columns 26 have therein pistons attached by the brackets 25a to the rods 25, the lower ends of which are attached to the movable platform 28 to which the lower end of the container 10 is fixed. In FIGURES 1 and 2 the pistons 27 are shown as solid cylindrical members while in FIGURE 24 they are shown as hollow. Platform 28 rises and falls with rods 25 thus collapsing and expanding container 10. In the embodiment of the invention illustrated herein collapsing of container 10 is accomplished by air pressure acting on the bottom of pistons 27, and expansion of container 10 is accomplished by gravity alone, in which case platform 28 has substantial weight, or by gravity aided by counterbalancing air pressure on top of the heads of pistons 27a as shown in FIG. 24.

Between the base 24 and the platform 28, means to be described comprising an air cylinder, plunger and escape valve are provided for slowing down the expansion of container 10 near the end of its expanding movement thus providing an interval during which the pressure in container 10 is substantially constant. In FIG. 4 a stud 29 is shown projecting down from the bottom of container 10 having a portion 29a of reduced diameter adapted to coact with the spring pressed plunger 29b to provide for the quick assembly of container 10 to the movable platform 28.

Mounted on the base 24 is valve chest 30 (FIGS. 2 and 3) housing the three needle valves 32, 34 and 36 which are controlled respectively by knobs 33, 35 and 37 each of which is surrounded by a calibrated ring. These valves control the flow of compressed air within passages provided in base 24 and which are best seen by reference to the schematic arrangement illustrated in FIGURE 1. The compressed air used in the said passages is employed for collapsing container 10 and is entirely separate from the gas or gases contained within the container means and exchanged between said means and the patient through the anesthesia equipment.

Valve 32 controls the admission of compressed air from supply conduit 38 to passage 40 from which it flows to passage 42 when valve member 44 of valve assembly $v$ is unseated. Passage 42 communicates with both hollow columns 26 through branches 42a and 42b, and gas supplied and exhausted through passage 42 serves to raise and lower the cylindrical pistons which move up and down within said columns and in turn raise and lower platform 28 thereby collapsing or expanding the bellows 10.

Valve 34 controls the exhausting of gas from columns 26 and passage 42 through passage 46, when the ring 48 on the head portion 49 of valve assembly $v$ is unseated and valve member 44 is seated, which is the position shown in FIGURE 1.

Valve 36 controls the exhausting of air from air chamber 50 in base 24, through passage 52. The outer end portions of passages 46 and 52 are shown merging in a common discharge passage 54.

Air chamber 50 is not supplied with compressed air but is open to atmosphere through passage 52. Piston 58 is urged in a direction away from the outlet to passage 52 by coil spring 59, and has the plunger 60 extending through the top of the chamber in which the small port 56 is provided. When the descending platform 28 strikes plunger 60 its downward movement is resisted and slowed in proportion to the rate at which the adjustment of valve 36 allows air to escape from chamber 50 through passage 52. Valve 36 may be adjusted to slow the downward movement of piston 58 so that during the final portion of the expansion of bellows 10 the negative pressure exerted on the patient's lungs from container 10 through the anesthesia equipment and face mask, is substantially level thus providing in effect a pause between the exhalation and inhalation phases of a breathing cycle.

This leveling off of the pressure curve approaching zero provides a pause in the breathing cycle enabling the operator to make the cycle of the device correspond with the breathing cycle of the patient. The duration of the interval during which the pressure curve is thus substantially flattened is determined by the position of platform 28 when it strikes plunger 60 and in the illustrated embodiment of the invention this depends upon the distance to which plunger 60 extends above platform 28.

The position of valve assembly $v$ is controlled by toggle mechanism comprising the toggle arms 62 and 63, the knife edge inner ends of which are received in the V-shaped indentations $a$ and $b$ provided in the opposite faces of the enlarged lower end 64a of the control rod 64 extending upwardly from the top of valve chest 30. Rod 64 is supported by said toggle arms and is movable up and down to actuate the toggle mechanism, being guided by the downwardly extending guide pin 65 which extends through an opening in the valve chest 30 (FIG. 3). Toggle arm 62 is supported at its outer end on the reduced portion 66a of a post 66 projecting up from valve chest 30. Toggle arm 63 is pivotally supported intermediate its ends on the reduced portion 67 of a post 68 projecting up from valve chest 30, and the outer end of arm 63 is connected by the reduced portion 69 of valve stem 70 of the valve assembly $v$. The outer ends of the toggle arms are joined together by coil spring means 72.

Projecting from the moving platform 28 is a lip 74, shown schematically in FIG. 1 as an angle extension member, having a slot 76 through which the control rod 64 extends. On rod 64 below the outer ends of extension 74 is a lower fixed stop 78, and above the outer end of extension 74 is an upper adjustable stop 80, rod 64 being preferably calibrated to facilitate setting of the position of adjustable stop 80 as may be desired to determine the volume of container 10, i.e. the extent to which it can be expanded which of course determines the volume of gas it can receive from the patient's lungs, and the volume of gas it can transfer to the patient's lungs when it is collapsed.

When expansion of container 10 moves its lower end to the end of its downward stroke lip 74 contacts fixed stop 78 and moves control rod 64 downwardly enough to actuate said toggle arms downwardly, thus raising valve stem 70 and ending the negative or exhalation phase of the breathing cycle and starting the succeeding positive phase. When the collapsing of container 10 causes the lip 74 to strike the upper adjustable stop member 80 control arm 64 is elevated just enough to trip the toggle mechanism and lower valve stem 70 causing valve 44 to close and unseating ring 48, thus ending the positive phase of the breathing cycle and starting the negative phase.

Control rod 64 may be raised or lowered and locked in either said positions to stop automatic operation of the device, by means of the control dial 82 on the upper end of control rod 64. As best seen in FIGURES 1, 3 and 7–13 dial 82 is mounted for rotation on pin 83 which extends through vertical slot 84 in control rod 64 into the end of arm 85 which projects from the main body of the device. As shown in FIGURE 3 it projects from the valve chamber 92 to be described. Surrounding the pin 83 is a bearing sleeve 86 having the flange 86a, and between said flange and the rear of dial 82 the grommet $g$ is provided to provide friction and prevent dial 82 from turning too readily. On rod 64 above and below slot 84 the cams 87 and 89 are provided and positioned to be contacted by the crescent shaped cam follower 88 on the rear face of dial 82. When the dial is turned to the position shown in FIGURE 9 the contact between the cam follower 88 and the cam 87 raises rod 64 until the lower end of slot 84 abuts against pin 83 and the rod 64 is locked in raised position. In this position the valve assembly $v$ is lowered and valve 48 in passage 42 is open so that when the dial is turned to the middle position shown in FIGURE 10 automatic operation will be resumed at the start of the downward movement of container 10 which corresponds with the exhalation phase of the breathing cycle.

When the dial is turned to the position shown in FIGURE 12 the contact between the cam follower 88 and cam 89 lowers rod 64 until the upper end of slot 84 abuts against pin 83 and the rod is locked in lowered position. In this position the valve assembly $v$ is raised and valve 48 is closed, and valve 44 in passage 42 is open so that when the dial is turned to middle or running position automatic operation will be resumed at the start of the upward movement of container 10 which corresponds with the inhalation phase of the breathing cycle. The dial 82 is shown provided with the finger piece 82a and cam follower 88 with the stop 88a.

Container 11 is connected to container 10 by the tube 90 and the valve chamber 92. A safety valve assembly 91 is provided in the wall of tube 90. It comprises the valve 91a, the stem 91b extending through the tube wall, and the coil spring 91c around the stem. Cross member 22 constitutes the lower wall of valve chamber 92 and has in it the two ports 94 and 96 controlled by the valves 98 and 100 respectively. The upper wall of chamber 92 is flexible diaphragm 101 on which the brackets 102 and 104 are supported. From the upwardly extending arms of said brackets project the pins 102a, 102b and 104a, 104b respectively which extend through the free end portions of arms 106a, 106c and 108a, 108c respectively of the U-shaped members 106 and 108. The said members 106 and 108 are pivotally mounted on posts 110a, 110b and 112a, 112b respectively, said posts extending up from the valve chamber on opposite sides of flexible diaphragm 101 and engaging said arms 106a, 106c and 108a, 108c intermediate their ends by pivots $p$.

Projecting from the middle portions 106b and 108b of U members 106 and 108 are the calibrated balance arms 114 and 116 respectively on each of which the weights $w$ are slideably mounted. As a weight $w$ is moved outwardly on either of said arms 114 or 116 the U member by which said arm is carried is rotated, depressing the free ends of the arms of said member and thus exerting pressure downwardly on flexible diaphragm 101 through the bracket 102 or 104 which is connected to the free ends of the arms of said member.

Valve 98 opens upwardly to pass gas from container 10 to container 11 through tube 90. As best seen in FIGURE 6 a pin 118 extends downwardly through the horizontal mid-portion of bracket 102, the flexible diaphragm 101, and the plate 120 on the under side of said diaphragm, into a concavity 122 in the upper surface of valve 98. In order to open valve 98 the pressure in container 10 must overcome the force with which pin 118 pushes down on the valve. It will be understood that by adjusting the position of weight $w$ along balance arm 114 the pressure exerted downwardly on valve 98 through the flexible diaphragm and pin 118 may be varied as desired thus controlling the pressure which can be built up in container 10 during the inhalation phase. If in operation of the device an increase in the pressure in container 10 is needed to deliver the desired volume of gas into the patient's lungs the operator can obtain this increase in pressure immediately by moving weight $w$ outwardly on arm 114.

As best seen in FIGURE 7 valve 100 opens downwardly into container 10 when its weight and the pressure in container 11 exceeds the pressure in container 10 and the force exerted from balance arm 116 tending to hold the valve in closed position. This force is variable as described above by changing the position of weight $w$ on balance arm 116 which, through the pivoting of member 108 varies the thrust on the flexible diaphragm 101 exerted through bracket 104. Extending downwardly through the horizontal middle portion of said bracket is the pin 124 the pointed lower end of which contacts the top link 126 on one side of the pivot 127, which is provided at the upper end of an arm 128 projecting up from the annular member 130 wihch is inserted in port 96 and has the downwardly projecting flange 132 on which valve 100 seats. The other end of link 126 is bored at 134 to receive the upper end of the valve stem 136, which fits loosely in said bore to permit a slight swinging movement of the valve stem within said bore, and is suspended by the nut 138 on the upper end of the valve stem.

On the lower surface of valve 100 is the projection 140 which extends through an opening 142 in the Z bracket 144 depending from the frame member 22. Bracket 144 limits the downward movement of valve 100, projection 140 serving as a guide and opening 142 as its guideway.

Pivotally mounted on tube 90 by pivot 146 is the angled valve locking arm 148 having at its lower end the cam end 150 which may be moved into contact with the inner ends of said balance arms 114 and 116 to depress them and thus open said valves 98 and 100, and lock them in open position.

This is done if for any reason it is desired to operate the device manually, in which case control dial 82 is turned to lock the rod 64 which controls automatic operation and container 11 is then expanded and collapsed by the operator, the gas passing between container 11 and conduit 12 through the open valves 98 and 100 and the upper end of container 10 which remains stationary.

The container or bellows 11 is fixed on top and bottom to the thin rigid support members 160 and 162 respectively which have the rearwardly extending arms 160a and 162a which curve toward one another and are pivotally interconnected by pivot 161. The lower support member comprises the central downwardly extending tubular portion 164 which is internally threaded and engaged on the top end of tube 90 which interconnects said bellows 10 and 11.

The upper member 160 has a central removable portion 166 which as shown has the threaded flange 166a by which it may be screwed into member 160, the finger grip means 167 being provided to facilitate removing or inserting said portion 166. In the portion 166 is the port 168 and carried by said portion is a valve 170 which will open automatically to jet in air if bellows 11 is expanded or contracted more than a predetermined amount, either during automatic operation of the device or during manual operation. Valve 170 is part of an assembly which comprises also a perforated cap 172 extending over port 168 in the upper member 160, and the valve stem 174 which extends from the valve member 170 through the perforated cap 172 into contact with a member 176 carried at the outer end of a spring arm 178 which is also pivotally mounted on pivot 161, as by means of the ears 179 extending down from the spring arm adjacent its rear end. The rear end 178a of said spring arm 178 is bent at right angles and acts as a stop which, when the bellows is expanded a predetermined amount in excess of its ordinary volume, strikes the pivot 161 causing said spring arm to resist further expanding movement of the bellows and thereby acting to depress valve stem 174 and opening said valve 170 to exhaust gas.

Projecting downwardly from removable portion 166 of said upper support member 160 is the member 182 providing a pivot support for the spring arm 184 intermediate its ends. One end of said spring arm is attached to valve 170 and the other end of said spring arm is spaced from the said removable portion 166 of the upper support member 160 by a coil spring 184a; projecting downwardly from this end of the spring arm is a stop member 186 which, when bellows 11 is collapsed more than a predetermined amount in excess of its ordinary operation strikes against the inwardly extending portion 188 of the lower plate. This action raises the end of the spring arm carrying said stop which causes the end of the arm attached to said valve to move downwardly, thus again opening said valve but providing for the escape of gas if the collapsing movement is continued beyond the usual or predetermined amount.

When the amount of gas exhaled by the patient exceeds the volume for which the device is set the excess will be exhausted through valve 170. Similarly if the volume for which the device is set is greater than the amount of gas delivered to it from the patient's lungs or other source, the valve 170 will open and admit air to make up the deficiency.

Gases can be manually exhausted from container 11 by manually pressing valve stem 174 and collapsing container 11. Atmosphere air can be jetted into container 11 by first collapsing said container as described above and then with valve stem 174 manually compressed pulling up on said container 11 and thus filling it with atmospheric air vented through valve 170.

In the operation of the device for automatic volume control the operator having connected compressed air inlet conduit 38 to a source of compressed air, adjusts the volume of the device by positioning stop 80 as desired on rod 64 which controls automatic operation, and may adjust the position of weights w on balance arms 114 and 116 respectively to regulate the pressures necessary to open valves 98 and 100 respectively, which determine the positive and negative pressures that may be built up in container 10, during the inhalation phase of the breathing cycle. He then turns dial 82 to running position to free the control rod 64, and the device will supply or exchange the volume of gas for which it is set. By adjusting valves 32, 34 and 36 the operator can regulate the duration of the expanding and contracting movements of bellows 10 and the overall duration of the cycle including a pause or interval between the said phases to accord with the breathing of the patient, and thus obtain the optimum condition for anesthesia.

If the patient's breathing cycle changes the operation of bellows 10 can be readily adjusted to conform.

When the intended volume of gas is being successfully supplied and exhausted during automatic operation container 11 will remain stationary. If for any reason the pressures for which weights w are set is not enough to put the desired volume of gas into, or exhaust it from, the patient's lungs this fact will be evident because bellows 11 will expand or contract showing that valve 98 or valve 100 has opened. This may be quickly corrected by increasing the positive and negative pressure limit for bellows 10 by moving weights w on the balance arms. If valve means 170 on bellows 11 opens it will indicate a supply of, or demand for, gas in excess of the volume for which the device is set.

The expanding and contracting of bellows 11 during automatic operation give visual signs to the operator of the device. The raising of the positive balance arm 114 and opening of valve 98 to exhaust some of the gas from container 10 into container 11, thus expanding 11, indicates greater resistance in the patient's circuit. A change in the patient's breathing pattern is evidenced by an up or down movement of container 11 during the exhalation cycle. These signs are of value to the anesthetist and remove his dependency on the sense of feeling which is his only guide when administering anesthetic by squeezing a gas filled bag.

If for any reason manual operation is desired (some operators prefer it in time of emergency) the valves 98 and 100 are locked in open position, as by lifting locking arm 148 and the operator grasping the finger piece 160b and alternately collapsing and expanding bellows 11 thus effecting gas supply and exhaust (in the open system) or exchange (in the closed system). In this way the operator may control the patient's breathing by manually produced positive, negative or positive and negative pressures.

Valves 98 and 100 are also locked open when stopping automatic operation to determine if the patient is breathing on his own by observing if container 11 is expanding and contracting.

In FIGURES 16–23 a combination of third valve means 222 (relief valve) and fourth valve means 198 (bleed valve) is shown by means of which gas is exhausted directly from container 10 to a chamber 190 defined within the valve chest 92 by wall 192, and from chamber 190 to air or to the reserve container 11. In this embodiment of the invention the valve chest 92 comprises a portion 194 projecting into the chamber 190 and defining a valve seat 196 adapted to seat the conical front end of a valve member 198. Extending from outside and in front of the valve chest 92 through the wall 192 into chamber 190 is the valve sleeve 200, and within sleeve 200 is a valve stem 202 extending from valve member 198 through the front wall of valve chest 92 and having at its outer end an adjustment handle 204 by which the valve stem 202 and the valve 198 may be rotated to move the valve member between the valve seat 196 and a valve sheat 206 which is defined by the front end of the sleeve 200. The handle 204 is mounted on an externally threaded enlarged portion 208 of valve stem 202. On the handle or knob 204 is a pointer which travels over a surrounding calibrated ring 210 for convenience in measuring the amount of rotation of valve stem 202. Within the control handle 204 a spring member 212 is provided surrounding the outer end of the valve stem 202 and interposed between the outer end of portion 208 of the valve stem and the end of the counterbore 216 in handle 204, providing frictional means for retaining the handle 204 in selected position.

The space within sleeve 200 surrounding valve stem 202 provides a bleed passage interconnecting the interior of chamber 190 with atmosphere through exhaust ports 214.

By means of valve 222 and coacting valve 198 the amount of the gas in the apparatus may be maintained substantially constant thus avoiding building up the level of unexchanged gas in the patient's lungs due to an excess of the continuously added gas over the amount which is being continuously metabolised and taken up by the patient.

Extending from the counterbore 196 within the portion 194 of casting 92, through the chamber 190 and through the wall 192, into the main portion of the valve chest, is the passage 218. Since the interior of the valve chest communicates with the neck 90 leading to the small bellows or gas storage chamber 11 passage 218 serves to interconnect the space 196 with neck 90 and permit flow of gases from chamber 190 to the storage chamber when valve 198 is unseated from valve seat 196 as illustrated in FIGURES 18, 22 and 23.

Within the frame cross member 22 forming the bottom of the valve chest, and located adjacent the valve seats 94 and 96 for the first and second valve members, is a third port 220 (best shown in FIGURE 20) providing a valve set for the valve member 222 which is mounted in such a way that it opens with the beginning of the exhalation phase of the breathing cycle, which corresponds with the expansion of bellows 10 in the embodiment of the invention illustrated herein, thus permitting gas to flow freely from container 10 into chamber 190 during the exhalation phase.

Valve 222 is supported from flexible blade 224 which at its outer end is in frictional sliding contact with one of the guide rods 25 serving to guide a piston 27 or 27a in one of the hollow columns 26. Flexible blade 224 is screwed into an arm 226 which is pinned at its inner end to a shaft 228 which extends through the wall of the valve chest 92. Fixed at the other end of the shaft 228 within chamber 190 is an arm 230 which carries at its inner end an enlargement 232 which is bored vertically with the slot or bore 234 to loosely receive the pin 236 extending vertically upwardly from valve member 222. Between arm 230 and the inner surface of the wall defining the valve chest 92 surrounding shaft 228 an O ring 238 is provided to prevent escape of gas through the casting wall around shaft 228.

This construction is such that when guide rod 25 is moving in one direction during collapsing of container 10 (inhalation phase) the end of blade 224 in frictional contact with guide rod 25 slides along the guide rod and valve 222 remains seated, but when the guide rod moves in the opposite direction at the inception of and during the expanding movement of container 10 (exhalation phase) the frictional engagement of arm 224 with guide rod 25 causes the outer end of blade 224 to move together with the guide rod causing the inner end of arm 230 to be raised and thus rendering valve member 222 free to ride up on guide pin 236 thus placing container 10 in communication with the interior of chamber 190. From chamber 190 the gas then flows either through the space in sleeve 200 surrounding the valve stem 202 and is exhausted to atmosphere through ports 214 or it flows into the space 216 within the casting portion 194 and through conduit 218 into the neck 90 and thus into the storage chamber or upper bellows 11, or passes simultaneously through both the exhaust ports 216 and the passage 218 depending upon the position of valve 198. As shown in FIGURES 21, 22 and 23 valve 198 may be adjusted by the handle means 204 to close the passage 218 leaving open the passage to the exhaust ports 214 (see FIG. 21) or it may be moved to an intermediate position between the valve seats 196 and 206 thus permitting part of the gas entering through the valve 222 to be vented to atmosphere while another part of the gas is passed to the storage chamber through passage 218 (see FIG. 22), or may be moved to the position shown in FIGURE 23 in which the valve is seated against the valve seat 206 at the front end of sleeve 200 thus closing passage to the exhaust ports 214 and leaving fully opened the passage 218.

FIGURE 24 is a modification of FIGURE 1 showing passages by which a portion of the compressed air introduced into the base of the apparatus through inlet 38 for raising and thus collapsing the bellows-container 10 is communicated through branch conduits to space within hollow columns 26 surrounding the piston rods 27a (which for lightness in weight are made hollow) within said cylinders, thereby exerting partly counter-balancing pressure on the top of the heads of piston rods 27a. By this means the weight required to expand the container 10 is greatly reduced making it possible to substantially reduce the thickness and weight of member 28.

As shown in FIGURE 24 in addition to passage 40 leading from inlet 38 a branch passage 250 is provided leading from inlet 38 to the space 252 around the hollow piston 27a within the columns 26. As shown herein one branch conduit 250 is connected into the said space within one of said hollow cylinders and has a branch 250a leading to the similar space within the other of the hollow cylinders 26. It will be readily seen that air under pressure passing through passage 250 will enter the said space surrounding the pistons within the column 26 and will exert a force acting downwardly on the reduced upper surface of the piston heads 254. To prevent leakage of this pressure past the piston heads, the lower part of each piston head is provided with an annular groove in which is seated a rubber ring 256 which as shown herein is hollowed out with an annular groove 258 to provide a better seal.

It will thus be seen that there has been provided by this invention a method and apparatus in which the various objects hereinabove set forth together with many thoroughly practical advantages are successfully achieved. As various possible embodiments might be made of the mechanical features of the above invention and as the art herein described might vary in various parts, all without departing from the scope of the invention, it is to be understood that all matter hereinbefore set forth or shown in the accompanying drawings is to be interpreted as illustrative and not in a limiting sense.

What I claim is:

1. Apparatus of the kind described comprising an expansible and collapsible gas container, conduit means for communication between a patient and said container, means for moving the container for alternately expanding and collapsing said container to draw gas into and exhaust it from said container through said conduit, and adjustable means for limiting the expanding and contracting of said container to control the volume of gas alternately drawn into, and exhausted from said container, said adjustable means comprising a calibrated scale, a fixed stop and a movable stop on said scale and means carried by said container and having a portion disposed for travel along said scale between the stops and means responsive to contact between said means carried by the container and said stops respectively to reverse the direction of movement of the container.

2. The apparatus claimed in claim 1 including valve means operable during the expanding movement of said container to exhaust gas from the container during exhalation.

3. Apparatus of the kind described comprising, a first expansible and collapsible gas container, means for moving the container to alternatively expand and collapse it, first gas conduit means for communication between a patient and said first container, a second gas container, second, separate conduit means independent of the first conduit means interconnecting the first container to the second container, first valve means controlling the flow of gas from said first container to said second container and second valve means controlling the flow of gas from said second container to said first container and means for controlling said valve means to cause gas to flow from said first container to said second container when the pressure in said first container exceeds a predetermined maximum amount and to flow from said second container to said first container when the pressure in said first container falls below a predetermined amount.

4. The apparatus claimed in claim 3 including third valve means disposed between the first gas container and said second conduit means and adapted to open during exhalation to reduce the volume of gas in said first container and speed the exhausting of gas from a patient's lungs, and means responsive to expanding movement of said container to open said third valve means.

5. The apparatus claimed in claim 3 including third valve means disposed between the first gas container and said second conduit means and adapted to open during exhalation to reduce the volume of gas in said first container and speed the exhausting of gas from a patient's lungs especially during the first portion of each exhalation period, a chamber into which said third valve means opens, a passage from said chamber to atmosphere, a passage from said chamber communicating with said storage chamber, fourth valve means in said chamber and means for adjusting said fourth valve means to regulate the amount of gas which is transferred from said chamber to said second container and the amount which is vented to atmosphere.

6. The device claimed in claim 3 in which each of said first and second valve means comprises a valve, a valve stem, an arm extending from said stem, and a weight adjustable in position along said arm to vary the pressure required to open said valve.

7. The apparatus claimed in claim 3 in which said second gas container is also expansible and collapsible independently of said first container and means are provided for locking said first container in inoperative position and said first and second valve means in open position thereby providing continuous communication between said gas conduit means and said second container.

8. The apparatus claimed in claim 3 in which said second gas container is also expansible and collapsible independently of said first container, means are provided for locking of said first and second valve means in open position and said second container is provided with valve means adapted to open to admit or exhaust gas when it is expanded or collapsed more than predetermined amounts.

9. Apparatus for controlling breathing comprising, an expandable and collapsible gas container, first conduit means for communicating between a patient and said container, means for alternating expanding and contracting said container to draw gas from said conduit means or expel gas into said conduit means, fixed means to which said container is connected at one end, a movable platform to which the other end of said container is connected, valve means leading from said gas container and operative to open and exhaust gas from said container while said container is expanding, and means movable with the container for actuating said valve means including means frictionally engaging with said valve means.

10. Apparatus for controlling breathing comprising, an expansible and collapsible gas container, conduit means communicating with said container, a fixed support, and means connecting one end of said container to said fixed support, a moveable member, and means connecting the other end of said container to said movable member, means including said moveable member for moving said moveable member toward and away from said fixed support, adjustable means for controlling the rate of movement of said moveable member toward said fixed support, adjustable means for controlling the rate of movement of said moveable member away from said fixed support, and adjustable auxiliary means for controlling the rate of movement of said moveable member away from said fixed support operative near the end of the movement of said moveable member away from said fixed support.

11. A system of apparatus for controlling breathing comprising, a gas container, a conduit connecting said gas container to means for supplying gas to a patient, means for moving said container to alternately expand it and collapse it to supply gas to and exhaust gas from a patient's lungs through said conduit, a gas storage chamber separate from said gas container, a chamber intermediate said container and said storage chamber, valve means operable while gas is being drawn from the patient's lungs to open and allow gas to flow from said container into the said intermediate chamber, passage means connecting between said intermediate chamber and said storage chamber, other passage means connecting between said intermediate chamber and atmosphere, valve means in said intermediate chamber for controlling the flow of gas from said chamber through said passage and means for controlling said last mentioned valve means to open one or both of said passages.

12. Apparatus for exchanging gas between a collapsible gas container and a receiver comprising a gas container, a conduit means for interconnecting said container and a receiver, means for alternately expanding and contracting said container, exhaust valve means in the container wall operable during expansion of said container to open and facilitate speedy exhausting of gas from said receiver, and other valve means operable independently of said exhaust valve means for opening to supply gas into said container when the pressure therein falls below a predetermined amount, a storage chamber, a chamber intermediate said container and said storage chamber into which said exhaust valve mean opens, a passage intercommunicating between said intermediate chamber and said storage chamber, a passage extending from said intermediate chamber to atmosphere, valve means in said intermediate chamber and means for controlling said valve means to permit flow of gas through either or both of said passages.

13. Device for producing controlled breathing which comprises gas container means, conduit means for interconnecting said container means with the respiratory system of a patient, means for causing the gas to flow from said container mean into the patient's lungs, means for causing gas to be exhausted from the patient's lungs, and means for controlling the amount of gas supplied to the patient's lungs and the amount of gas exhausted from the patient's lungs for each phase of each supply and exhaust cycle, means coactive with the volume control means for regulating the pressure under which the gas is supplied to the patient's lungs and separate means for controlling the pressure under which the gas is exhausted from the patient's lungs, the said means for controlling the pressure under which gas exhausted from the patient's lungs comprising valve means, and lever arms pivotally connected to the valve means, and weights adjustable along said lever arms respectively.

14. In a device of the kind described the combination of a first and second bellows type gas containers, conduit means for intercommunicating between the first bellows and the respiratory system of a patient, means for supplying gas into and exhausting it from said first bellows, conduit means interconnecting said two bellows, valve means in said conduit means for controlling exchange of gas between said two bellows, and adjustable means to regulate the pressure needed to open said valve means to thereby regulate the pressure in said first bellows, said means including pivoted arms, means connecting the arms to said valve mean respectively, and weights movable along said arms to adjust the loading of said valve means respectively.

15. The device claimed in claim 14 in which, vent means is provided in the second bellows adapted to vent in air when maximum movement in one direction of said second bellows is not sufficient to satisfy the need of the first bellows for gas as indicated by operation of said valve means, and to jet out gas when maximum movement of said second bellows in the opposite direction is insufficient to receive from said first bellows all the volume of gas needed to reduce the pressure within said first bellows sufficiently to permit closing of the valve means controlling flow of gas from the first bellows to the second bellows.

16. Apparatus for controlled breathing comprising, an expansible and collapsible gas container, conduit means communicating with said container, means for alternately expanding and contracting said container to draw gas from said conduit means or expel gas into said conduit means, means opposing expanding of the container, and means for regulating the amount of opposition to the expansion of the container including, a fluid chamber, a fluid conduit leading from the chamber, valve means for opening and closing said conduit, a piston in said chamber, means tending to move the piston in the direction of said gas container, and a piston rod projecting from said piston toward said container in position to be contacted by said cylinder as it approaches an end of its movement in one direction.

17. The apparatus claimed in claim 16 in which the said gas container is a bellows, the means for collapsing the bellows comprises fluid under pressure and a valve controlled conduit for bringing the fluid into operative relation to the bellows, the means for collapsing the bellows includes the force of gravity, and the means opposing expanding of the bellows is positioned below the bellows in a position such that the said piston rod is contacted by the bellows as it approaches the end of its expanding movement.

18. Apparatus of the kind described comprising, an expansible and collapsible gas container, conduit means for communication between a patient and said container, a plurality of stops at least one of which is adjustable in position to vary the distance between them, means carried by the container and disposed for travel between said stops, and means for moving the container and thereby causing it to alternately deliver into, and withdraw from, said conduit a volume of gas predetermined by the distance between said stops including fluid under pressure and means responsive to contact between said means carried by the container and said stops respectively to change the direction of movement of the container.

19. A device of the kind claimed in claim 18 including a calibrated scale and having the stops disposed along said scale, said scale being movable in response to contact by said means carried by the container with either of said stops and serving to actuate said valve means and thereby reverse the direction of movement of the container.

20. Apparatus for controlling breathing comprising an expansible and collapsible gas container, a first conduit leading from said container for connection to a supply of gas, a second conduit leading from said container for communication between said container and a patient, means for alternately collapsing and expanding said container to draw gas into said container through said first conduit and supply it from said container through said second conduit, first valve means providing for venting of gas from said container, second valve means providing for inflow of gas into the container to supplement gas supplied through said first conduit, means for controlling said valve means to cause gas to be vented from said container when the positive pressure within the container exceeds a predetermined maximum amount and to flow into said container when the negative pressure in said container falls below a predetermined amount, a plurality of stops at least one of which is adjustable in position to vary the distance between them, means carried by the container and disposed for travel between said stops, means including fluid under pressure for moving the container and thereby causing it to alternately deliver into, and withdraw from said second conduit a volume of gas predetermined by the distance between said stops and means responsive to contact between said means carried by the container and said stops respectively to reverse the direction of movement of the container.

21. Apparatus of the kind described comprising an expansible and collapsible gas container, conduit means communicating between a patient and said container, means for alternately expanding and collapsing said container to draw gas into and exhaust it from said container through said conduit, and adjustable means for limiting the expanding and contracting of said container to control the volume of gas alternately drawn into, and exhausted from said container, the mean for collapsing the container comprising a source of compressed air and means for delivering the compressed air to act against an end of said container, and the means for expanding the container comprising a member attached to the container and acting by gravity, the weight of the means for expanding the container being reduced by means of branch conduits through which compressed air is employed to exert pressure on said gas container in a direction tending to expand said gas container.

References Cited in the file of this patent

UNITED STATES PATENTS

| 2,629,227 | Wolfe | Feb. 24, 1953 |
| 2,737,176 | Fox | Mar. 6, 1956 |
| 2,766,753 | Koch | Oct. 16, 1956 |
| 2,770,232 | Falk | Nov. 13, 1956 |
| 2,880,719 | Andreasen | Apr. 7, 1959 |

FOREIGN PATENTS

| 723,178 | Great Britain | Feb. 2, 1955 |